No. 689,358. Patented Dec. 17, 1901.
E. HAIMAN.
OPERATING AND ADJUSTING MEANS FOR CULTIVATORS.
(Application filed Apr. 29, 1901.)
(No Model.) 3 Sheets—Sheet 1.
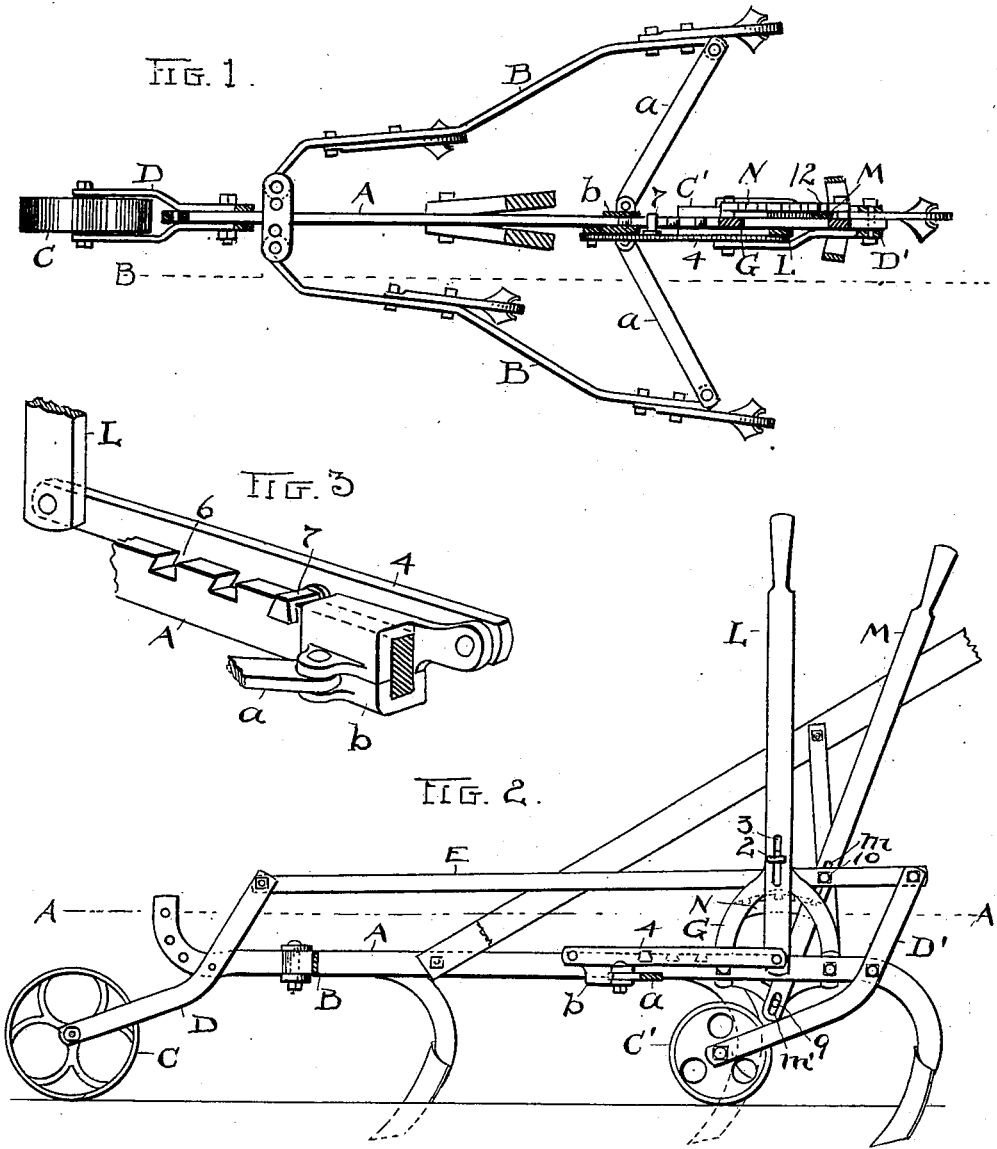

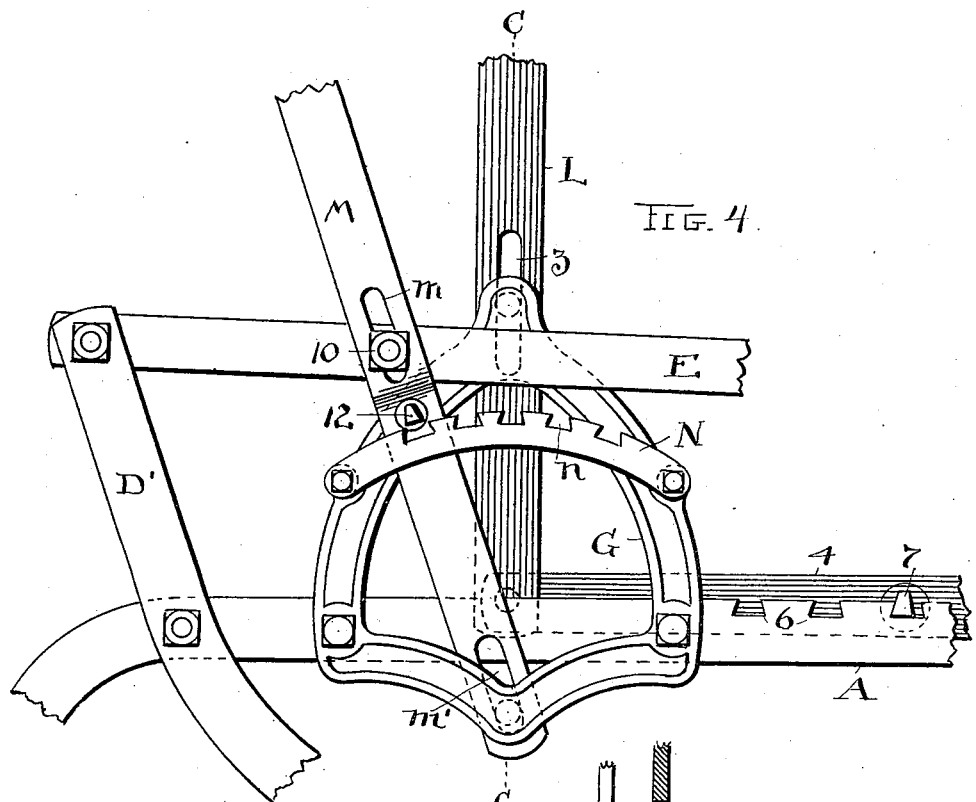
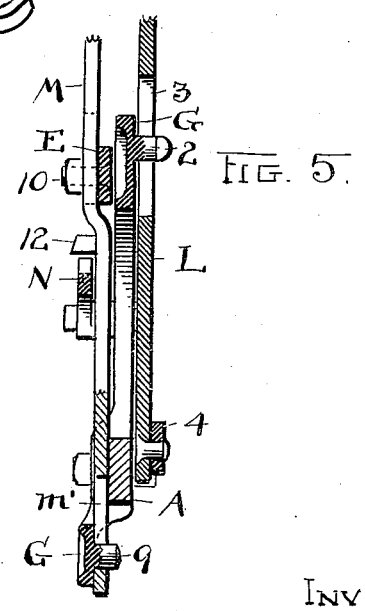

No. 689,358. Patented Dec. 17, 1901.
E. HAIMAN.
OPERATING AND ADJUSTING MEANS FOR CULTIVATORS.
(Application filed Apr. 29, 1901.)
(No Model.) 3 Sheets—Sheet 3.
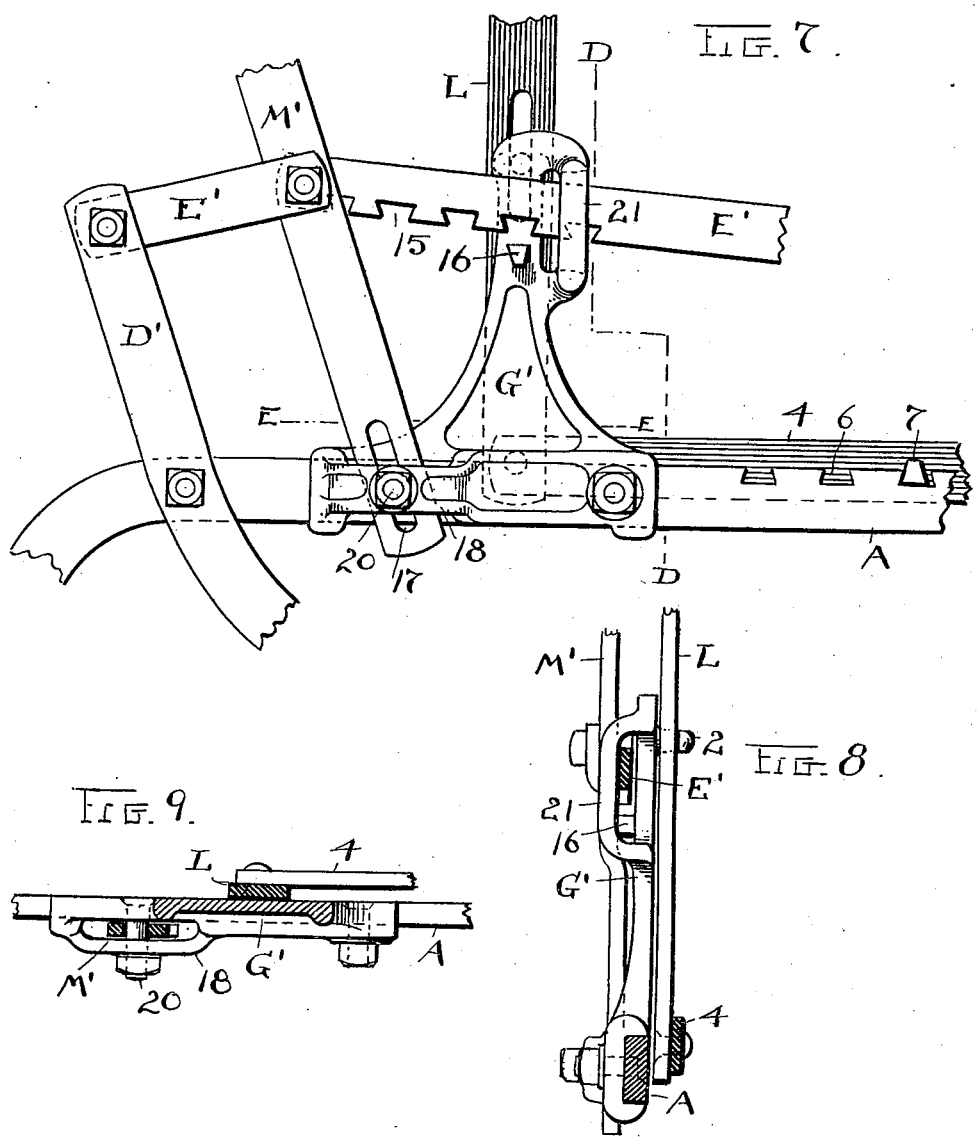

UNITED STATES PATENT OFFICE.

ELIAS HAIMAN, OF CLEVELAND, OHIO, ASSIGNOR TO THE EMPIRE PLOW COMPANY, OF CLEVELAND, OHIO, A CORPORATION OF OHIO.

OPERATING AND ADJUSTING MEANS FOR CULTIVATORS.

SPECIFICATION forming part of Letters Patent No. 689,358, dated December 17, 1901.

Application filed April 29, 1901. Serial No. 57,898. (No model.)

*To all whom it may concern:*

Be it known that I, ELIAS HAIMAN, a citizen of the United States, residing at Cleveland, in the county of Cuyahoga and State of Ohio, have invented certain new and useful Improvements in Operating and Adjusting Mechanism for Cultivators; and I do declare that the following is a full, clear, and exact description of the invention, which will enable others skilled in the art to which it appertains to make and use the same.

My invention relates to improvements in operating and adjusting mechanism for cultivators and other articles; and the invention consists in the construction, combination, and arrangement of parts, substantially as shown and described, and particularly pointed out in the claims.

As above indicated, the invention is admirably adapted to use in cultivators, and in this instance is shown in connection with a cultivator of the wheel type or what are known as "wheel-cultivators;" but the levers and the links and locking mechanism have adaptations to other uses, as is obvious from their construction and operation, and hence are not necessarily limited to the relationship of parts shown and described herein.

In the accompanying drawings, Figure 1 is a plan view of a cultivator embodying my invention looking down from line A A, Fig. 2, the portions above said line being removed in this figure. Fig. 2 is a side elevation of the cultivator with my improvements thereon, but with the near tooth bar or beam removed. Fig. 2½ is a view of a modification of lever L. Fig. 3 is an enlarged perspective view of a portion of the main or middle bar or beam and of the locking mechanism connected therewith, as hereinafter described. Fig. 4 is a side elevation of the rear portion of the cultivator with the parts enlarged as compared with Fig. 2 and viewed from the opposite side to said figure. Fig. 5 is a vertical sectional elevation on line C C, Fig. 4. Fig. 6 is a perspective elevation of the upper portion of the yoke or standard which supports the spreading-lever and other parts, as seen in different figures. Figs. 7, 8, and 9 represent a modification of the invention, and Fig. 7 is a side elevation of my improved mechanism and connected parts corresponding in detail to the parts and mechanism shown in Fig. 4. Fig. 8 is a sectional elevation looking to the left on line D D, Fig. 7; and Fig. 9 is a plan and part section looking down on line E E, Fig. 7.

The cultivator shown herein comprises the main or central beam A, two pivoted side beams B, which are alike in themselves and in all their connections and operations, links $a$, connecting said side beams with the sliding box $b$ on the main beam, supporting-wheels C and C' front and rear, respectively, and standards D and D', carrying said wheels and pivoted between their ends on central beam A and connected by single rod or bar E.

The foregoing description applies to the invention as seen in Figs. 1 to 6, inclusive. Figs. 7 to 9, inclusive, represent a modification of some of these parts.

It is not claimed herein that the cultivator thus shown is in itself a new invention; but the invention is confined more especially to the means or mechanism for operating the side bars and carrying-wheels, as hereinafter more fully described.

My invention therefore has in view a very simple and cheap construction which avoids all springs and small mechanisms liable to get out of order and wherein the action is positive and adjustment and locking of the parts sure and effective.

To these ends I employ, first, the lever L, which is termed the "spreading-lever" in this case and is supported on a yoke-shaped standard G, rigidly secured upon the central beam A and having a lug or fixed button 2 at its top, adapted to engage over a slot 3 lengthwise in said lever. The thickness of this button or lug corresponds substantially to the width of said slot, so that when the lever is turned to a horizontal position it can be engaged over the button, and then when it is turned vertically the side ears of the button engage at the sides of the slot and hold the lever in operating position. At the lower end of lever L a link 4 connects the same with box $b$ on central bar or beam A, and the said box is adapted to slide back and forth upon said beam when operated by lever L and connecting-link 4. Then as a means for locking all these movable parts in any desired position of adjustment, so as to fix the side beams B with respect to beam A, I form said beam with a series of notches 6 in its upper edge and provide link 4 with a lateral lug or tooth 7, adapted to rest down into the said notches. In this instance notches 6 are formed, preferably, with undercut or inwardly-inclined side edges, and the lug or tooth 7 likewise is fashioned on one or both sides with inclined sides matching the edges of the notches, so that as the link 4 is lowered and lug 7 enters a notch 6 the inclined engaging surface on these parts will measurably interlock and prevent accidental disengagement. In the operation of lever L to effect these adjustments it is only necessary to allow the lever to have as much freedom lengthwise as is provided by slot 3 on button 2. This enables link 4 to be raised sufficiently to disengage its lug from notch 6, and then said lever is free to be swung back and forth, with button 2 as its fulcrum, and thus spread or contract the side beams of the cultivator, as may be desired. When a desired relation of said parts is obtained, the lever is simply dropped and the lug or projection 7 lowered into the nearest notch 6, and then not only is the adjustment effected and fixed, but the parts will hold that relation until a new position is given them. The entire weight of said lever is free to rest down upon link 4 and keep it in its engaged position. Obviously the equivalent of this construction would be to notch link 4 and put the lug or tooth on beam A.

The wheels or rollers C C' are operated as to elevation by means of lever M, having a slot $m$, through which it is engaged with the bar E, and another slot $m'$ at its lower end, through which it is engaged with the lower portion of yoke-standard G, a lug or projection 9 or its equivalent serving for this lower engagement, while a short bolt and nut 10 serves to confine said lever slidably on bar E. This construction leaves lever M free to be raised and lowered independently of everything else and makes the projection 9 the fulcrum of its operation back and forth for the raising and lowering of wheels C C'. Said lever is shown as raised in Fig. 4 for adjustment and has a flat-sided lug 12, adapted to engage in the notches $n$ of segment N. The said notches $n$ have inwardly-inclined sides preferably matching somewhat the flat and inclined side or sides of lug 12, so as to make more positive engagement with said segment than might occur if said notches had plain right-angled sides. However, they may be plain sides or of any equivalent form and serve my purposes. When a full movement of lever M has been made, it is lowered into engagement with segment N, and wheels C C' are fixed as to elevation. By lengthening slots $m$ and $m'$ somewhat a straight notched bar or plate might be used instead of a segment N. Obviously, also, other like minor and practically unimportant changes might be made and be wholly within equivalent constructions.

Figs. 7, 8, and 9 show a modification of the mechanism for controlling the wheels. In this case bar E' is sectional with ends pivoted on or to lever M', and notches 15 are formed on the under side of said bar in front of the lever, adapted to engage and lock on lug or tooth 16 on standard G'. The lower end of said lever has a slot 17 and projects down through a keeper 18 on the base of standard G', wherein it is further confined by a bolt or pin 20 through slot 17. Keeper 21 confines bar E' on standard G'. The sectional formation of bar E' enables me to raise lever M' sufficiently without a slot at this point.

In Fig. 2½ I show a lever L', which is a modification of lever L, and a link 25, connected with standard G, serves to give said lever lengthwise or lifting movement, as in Fig. 2, so that the lever itself serves here, as in Fig. 2, as a medium for both effecting and releasing engagement of the locking parts and for laterally moving the side beams B. In both cases the said lever answers a double purpose and is part of the locking mechanism, as well as of the adjusting mechanism. In this modification link 25 becomes the fulcrum of the lever for purposes of operation in adjusting the side bars B.

Referring to Figs. 2 and 2½, it will be understood that the fulcrum of lever L is at 2 in Fig. 2, and the fulcrum of lever L' is on the standard G in Fig. 2½, in which the link 25 connects lever L' with its fulcrum, and both fulcrums are fixed, so as to give a positive leverage to both levers L and L'.

What I claim is—

1. An operating and adjusting mechanism for cultivators and other uses comprising an operating-lever constructed to be moved bodily lengthwise on a fixed fulcrum on which it is pivoted, a longitudinal beam and a box slidable thereon, and a link connecting said lever and box and constructed to lock on said beam to prevent sliding of the box when the cultivator is at work, substantially as described.

2. A beam having a series of notches and a slidable member thereon, in combination with a lever supported to allow lengthwise movement thereof bodily, and a link connecting said lever with said slidable member, said link constructed to lock on the notches of said beam, substantially as described.

3. In an adjusting mechanism for cultivators and other uses, a lever slotted lengthwise at its lower end to be raised and lowered lengthwise, and a fixed projection engaged in said slot and serving as a fulcrum for the lever, a notched and jointed connecting-bar pivotally connected with said lever and adapted to be moved thereby to effect desired adjustments thereof, and a fixed projection adapted to lock said bar when adjusted, whereby when the lever is bodily raised the said bar is disengaged from said projection and when it is lowered it is engaged therewith, substantially as described.

4. In a cultivator, the combination of a beam and a lever having a slot in its lower end through which it is fulcrumed on said beam, a set of wheel-standards front and rear on the cultivator and a jointed bar connecting the upper ends of said standards having said lever pivotally connected therewith, a standard on said beam and a notch and lug locking engagement between said standard and said lever and bar, whereby locking and unlocking occurs when said lever is bodily raised and lowered and the back-and-forth movement of said bar fixes the adjusted level of said wheels, substantially as described.

5. In cultivators, a central beam and two side beams pivoted thereon at their front ends, a slidable member on said central beam and links connecting it with the said side beams, in combination with a standard on the central beam and a lever having a slot through which it is fulcrumed on said standard, a connecting-link between said lever and said slidable member and a lug and notch locking connection between said connecting-link and said central beam, substantially as described.

Witness my hand to the foregoing specification this 22d day of April, 1901.

ELIAS HAIMAN.

Witnesses:
R. B. MOSER,
H. E. MUDRA.